US008985805B2

(12) United States Patent
Yang

(10) Patent No.: US 8,985,805 B2
(45) Date of Patent: Mar. 24, 2015

(54) EMERGENCY LIGHTING DEVICE

(75) Inventor: Man Ho Yang, Dongguan (CN)

(73) Assignee: Dong Guan Kam Tong Metal & Electric Co., Ltd., Dongguan, Guangdong (CN)

( * ) Notice: Subject to any disclaimer, the term of this patent is extended or adjusted under 35 U.S.C. 154(b) by 0 days.

(21) Appl. No.: 14/117,013

(22) PCT Filed: Jun. 22, 2012

(86) PCT No.: PCT/CN2012/077391
§ 371 (c)(1), (2), (4) Date: Nov. 11, 2013

(87) PCT Pub. No.: WO2012/175042
PCT Pub. Date: Dec. 27, 2012

(65) Prior Publication Data

US 2014/0085875 A1 Mar. 27, 2014

(30) Foreign Application Priority Data

Jun. 23, 2011 (CN) ...................... 2011 2 0215866 U

(51) Int. Cl.
*F21L 4/00* (2006.01)
*F21L 4/08* (2006.01)
*F21V 33/00* (2006.01)
*H02J 7/00* (2006.01)
*F21Y 101/02* (2006.01)

(52) U.S. Cl.
CPC ............... *F21L 4/08* (2013.01); *F21V 33/0076* (2013.01); *H02J 7/0047* (2013.01); *F21Y 2101/02* (2013.01)
USPC ........................................... 362/183; 362/197

(58) Field of Classification Search
USPC ................................. 362/197, 183, 199, 191
See application file for complete search history.

(56) References Cited

U.S. PATENT DOCUMENTS 5,119,280 A * 6/1992 Yang ............................ 362/191
7,347,581 B2 * 3/2008 Krieger ......................... 362/183
7,557,720 B2 * 7/2009 Rubin et al. .................. 340/574
2004/0252497 A1 * 12/2004 Lim ............................. 362/202

* cited by examiner

*Primary Examiner* — Tracie Y Green
(74) *Attorney, Agent, or Firm* — Shimokaji IP

(57) ABSTRACT

An emergency lighting device includes a charging stand and a flashlight disposed upon the charging stand to charge. The charging stand includes a base, a circuit controller and several lights. A cavity is formed on the front of the base to hold the flashlight. The circuit control board is disposed within the base. The lights are installed on the front of the base and electrically connected to the output terminal of the circuit control board which controls the external power supply for charging the flashlight and a power source of the flashlight for discharging electricity to the lights. The flashlight includes an alarm mounted on a tail of the flashlight to alarm. The alarm includes a mounting base, a buzzer stand, a buzzer, a buzzer drive circuit board, a switch controller and a conductive assembly. The device is capable of charging a flashlight and providing emergency lighting and alarm.

10 Claims, 10 Drawing Sheets

200

226

EMERGENCY LIGHTING DEVICE

FIELD OF THE INVENTION

The present invention relates to lighting device, and more particularly to an emergency lighting device that is capable of charging a flashlight and providing emergency lighting and alarm.

BACKGROUND OF THE INVENTION

In production and people's life, people may be faced with industrial accidents or natural disasters such as explosions, fires, earthquakes, etc. During these disasters, a power supply normally may go wrong or be cut off, which causes a normal lighting to go out. For ensure safety of persons and belongings, and dispose or arrange goods or others, people commonly use an emergency light to light temporarily. For example, emergency lights are installed on walls of a manufacturing workshop, so as to be convenient for operating the machines for the workers. Additionally, emergency lights also may be installed on walls of a stair or a safe exit, to help people to escape when a fire or other accidents happens which causes a sudden power-cut.

A conventional emergency light includes batteries, lights and a controller. Under normal condition, the lights are gone out, and the batteries are charged with controlled by the controller. When a power is cut and then detected, the controller will connect the batteries and the lights, so that the batteries could supply power to the lights to irradiate the external. This emergency light plays an important role in the accidents, however, it lacks flexibility due to it's fixed on the wall, which brings difficulty for people to use it at other places. As a result, an additional flashlight is also necessary when the emergency light is used during the sudden power-cut in dark.

Additionally, if a fire happens, it's very import to save oneself and call for help at the same time, so that he/she can be discovered by the rescuers as soon as possible. Thus a tool having lighting and alarming functions is quite necessary during escape.

SUMMARY OF THE INVENTION

An objective of the present invention is to provide an emergency lighting device that is capable of charging a flashlight and providing emergency lighting and alarm.

To achieve the above-mentioned objective, the present invention provides an emergency lighting device comprising a charging stand and a flashlight disposed upon the charging stand to charge. The charging stand comprised a base, a circuit controller, and several lights, and a cavity is formed on the front of the base to hold the flashlight; the circuit controller comprises a circuit control board, a positive contact, and a negative contact, the positive and negatives contacts are connected with the circuit control board and whose ends are protruded to the cavity; a positive conductive pin and a negative conductive pin corresponding to the positive and negatives contacts are provided on the flashlight, the flashlight is held in the cavity so that the positive and negatives contacts are electrically connected with the positive and negative conductive pins; the circuit control board installed in the base, whose input terminal is electrically connected with external power supply and output terminal is electrically connected with the flashlight that is installed on the front of the base; and the circuit control board is arranged to control the external power supply for charging the flashlight and a power source of the flashlight for discharging electricity to the lights. The flashlight comprises an alarm mounted on a tail of the flashlight to alarm, and the alarm comprises a mounting base installed in the flashlight, a buzzer stand installed in the mounting base, a buzzer installed in the buzzer stand, a buzzer drive circuit board installed in the buzzer stand and electrically connected with the buzzer, a switch controller installed at an end of the mounting base and electrically connected with the buzzer drive circuit board, and a conductive assembly installed in the mounting base and fixed on the buzzer, and electrically connected with the power source of the flashlight and the buzzer drive circuit board respectively; wherein the conductive assembly comprises a conductive post, a retainer, a conductive fiber plate, a conductive ring and a conductive spring, the conductive post has an upper end contacting a cathode of the power source of the flashlight, and a lower end electrically connected with a negative contact of the buzzer drive circuit board, and the conductive post is fixed on the retainer which is fixed on the conductive fiber plate, the conductive fiber plate is electrically connected with a positive contact of the buzzer drive circuit board, the retainer is sleeved with the conductive spring which has a lower end electrically contacting the conductive fiber plate and an upper end electrically contacting the conductive ring, and the conductive ring sleeves the retainer an is electrically contacts with an anode of the power source of the flashlight.

Preferably, the charging stand further comprises an indicator light installed on the front of the base and electrically connected with the circuit controller. The indicator light can indicate different signals when the flashlight is charging or charging is finished, so that the charging state is facilitated to be aware.

Preferably, a flange is formed at inner side walls of the cavity, and at least one recess is formed at outer side walls of the flashlight, the flange engages with the recess after the flashlight is disposed in the cavity. By cooperation between the flange and the recess, under a condition of that the flashlight is installed in the cavity, the flange can be acted as a guider and moreover a holder for holding the flashlight, so as to ovoid displacement of the flashlight to cause misalignment of the positive and negative contacts of the circuit controller.

Preferably, the charging stand further comprises a power adapter, a hole is formed at a bottom of the base, and the power adapter has an output terminal inserted into the hole and electrically connected with the circuit controller, and an input terminal electrically connected with the external power supply. The power adapter is arranged for converting the input voltage of the external power source to an output voltage that is suitable to charge the flashlight, so that the flashlight can be charged under a safe condition.

Preferably, the alarm further comprises a buzzer press plate installed in the mounting base and pressed against the buzzer, so that the buzzer can be fixed on the buzzer stand, which may avoid wobble or displacement of the buzzer to keep the function of the buzzer.

Preferably, the switch controller comprises a switch control plate, a sponge mat, and a switch cap sleeved on a switch button of the switch control plate, the sponge mat is sleeved between the switch control plate and the switch cap, and the switch control plate is installed in the mounting base. The switch control plate is used for controlling the connection or disconnection of the buzzer drive circuit board, the sponge mat is used for insulating the switch control plate from the external, and the switch cap covering on the switch button of the switch control plate is used for insulating and protecting the switch button.

Preferably, the alarm further comprises a casing mounted on the tail of the flashlight, and the center of the casing is hollow to accommodate the switch cap. Such a casing is used for preventing the outside impurity entering to the buzzer to baffle the acoustic.

Preferably, the alarm further comprises an elastic assembly having a pin, a spring and a baffle plate; a hole is formed on the pin, and a flange is extended from an end of the pin; the spring is disposed in the conductive post, one end of which is accommodated in the hole and electrically contacted a bottom of the hole, and the other end of which is electrically contacted the baffle plate; the baffle plate is electrically connected with the lower end of the conductive post, the pin has a head that is protruded to the upper end of the conductive post and electrically contacted the cathode of the power source of the flashlight, and the flange of the pin is capable of contacting a bottom of the conductive post to prevent the pin disengaging from the conductive post. With the arrangement that the spring is disposed in the conductive post, and the pin is urged by spring force of the spring, the pin can keep a connection with the cathode of the power source, thereby ensuring reliability of the conductive post and the power source.

Concretely, a hole is defined on the pin, and a flange is extended from the end of the pin. The hole has a bottom for contacting the spring, and the flange is capable of contacting the bottom of the conductive post thereby prevent the pin disengaging from the conductive post.

Preferably, the flashlight further comprises an integrative charging light-emitting device embedded in a front end of the flashlight and which comprises a light-emitting assembly, a switch assembly, a charging assembly and a device body; wherein the light-emitting assembly is installed in a front end of the device body and faced to a head of the flashlight, a conductive piece is provided at a back end of the device body and electrically connected with the light-emitting assembly, a cathode of the light-emitting assembly is electrically connected with the cathode of the power source of the flashlight; the charging assembly installed in the device body comprises the positive conductive pin one end of which is electrically connected with the conductive piece, and the other end of which passes through the device body and is formed on a head of the flashlight and electrically connected with the positive contact of the charging stand, and the negative conductive pin one end of which is electrically connected with the cathode of the light-emitting assembly, and the other end of which is electrically connected with the negative contact of the charging stand; and the switch assembly is installed on the device body and adapted for electrically connecting or disconnecting the power source of the flashlight with the light-emitting assembly. Due to the integrative charging light-emitting device is an integrative structure, thus its assembly and disassembly are very convenient on one hand, and the electrical connection between the integrative charging light-emitting device and the power source of the flashlight is good on the other hand, which has good impact-resistant performance to keep a reliable operation for the integrative charging light-emitting device.

Concretely, the integrative charging light-emitting device further comprises a microcontroller disposed in the device body, the microcontroller has an anode electrically connected with the anode of the light-emitting assembly and the conductive piece respectively, and a cathode electrically connected with the light-emitting assembly and the cathode of the power source of the flashlight respectively; the switch assembly has a bottom mounted on the microcontroller and a top protruded out of the device body, and the switch assembly is arranged to control light strength of the light-emitting assembly.

Preferably, the flashlight further comprises an impact-resistant device including a conductive protective piece, a conductive buffer spring and a hollow insulating base, wherein the insulating base is embedded in the head of the flashlight, the conductive protective piece is embedded in the insulating base and has a cavity to accept the buffer spring, and a contacting portion is provided at a front end of the conductive protective piece to contact with the insulating base; the buffer spring has a front end elastically connected with the conductive piece and a back end elastically inserted into the conductive protective piece and contacting the bottom of the cavity; and the conductive protective piece has a back end that is capable of elastically protruding out of the insulating base to contact with the anode of the power source of the flashlight. With such an arrangement, an impact or shock suffered by the integrative charging light-emitting device will be buffered, thereby avoiding a poor connection in the power source of the flashlight and thus always maintaining a good connection between the integrative charging light-emitting device and the power source.

In comparison with the prior art, the present invention provides a flashlight installed on the charging stand, and several lights installed on the base of the charging stand, and the lights will be turned on or turned off controlled by the circuit controller. If external power source is cut off, the lights can irradiate by using the power source of the flashlight, so that it can be easily noticed by persons in dark on one hand, and it can provide emergency lighting to help people to face with a power-cut situation on the other hand. In other words, the charging stand can be acted as a charger to charge the flashlight or functioned to provide an emergency light. Additionally, an alarm is formed on the flashlight, which controls the buzzer drive circuit to cause the buzzer sound by controlling the switch controller, so as to achieve a buzzer alarm. Such an arrangement of the alarm plays a very importance role in calling for help when an emergency happens. Furthermore, the alarm is installed in the flashlight directly, which increases the functions of the flashlight and facilitates the using and carrying. The handy emergency lighting device of the present invention is quit easy to use, which is applicable to family, workshop, hallway, dark way or safe exit.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
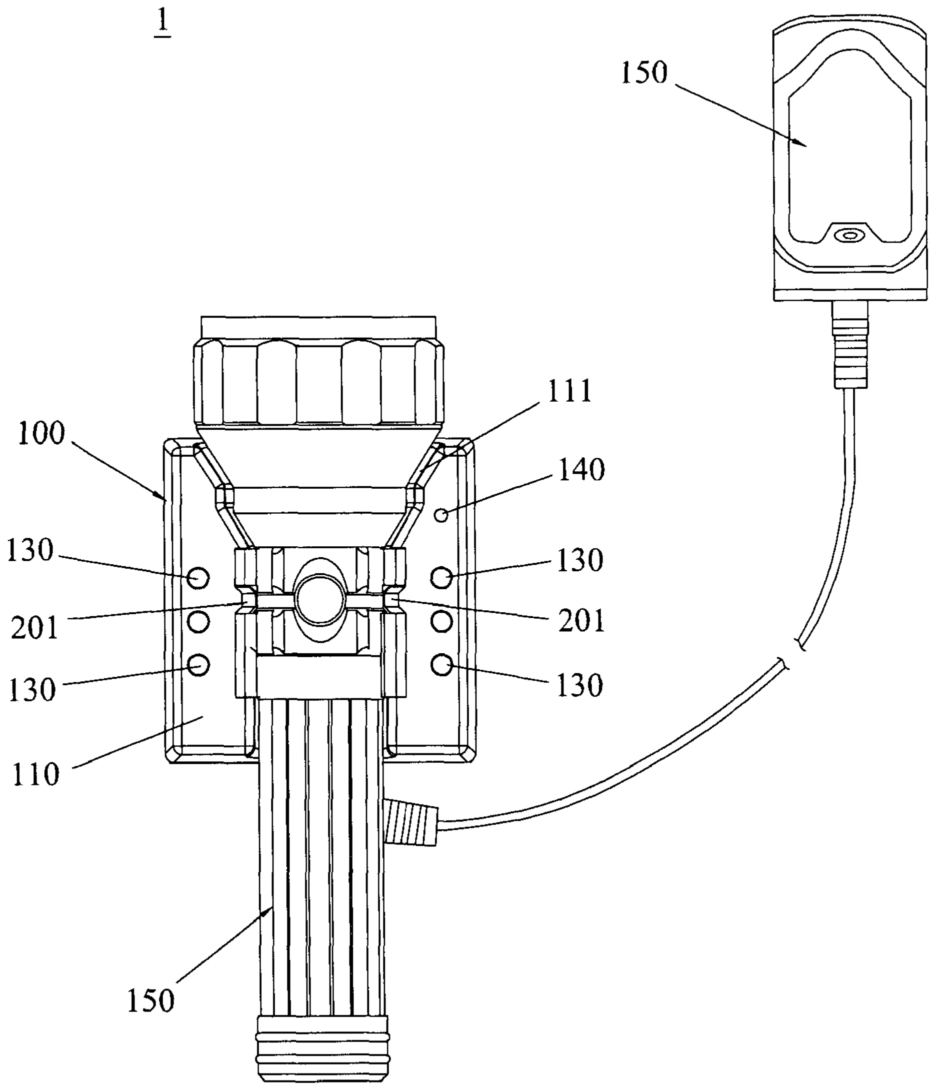
FIG. 1 is a schematic view of an emergency lighting device of the present invention.
Figure 2:
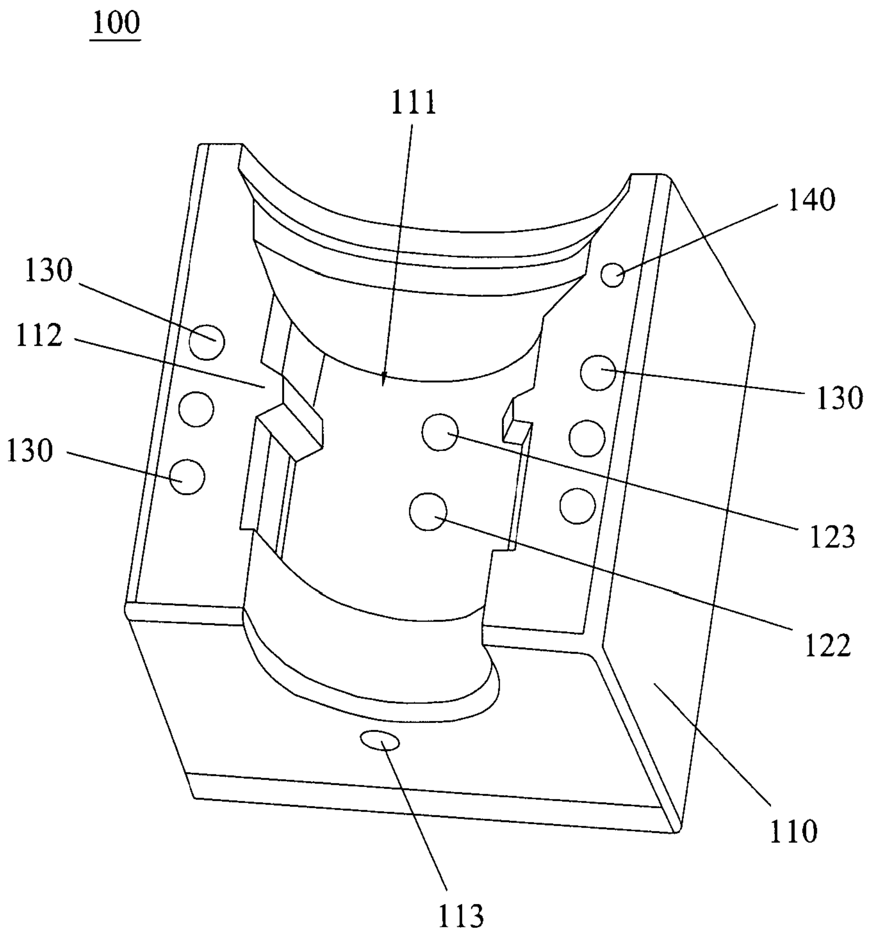
FIG. 2 is a schematic view of a charging stand of the emergency lighting device.

Referring to FIGS. 1 and 2, the emergency lighting device 1 of the present invention includes a charging stand 100 and a flashlight 200 installed in the charging stand 100 for charging. The charging stand 100 includes a base 110, a circuit controller 120, several lights 130, an indicator light 140 and a power adapter 150. A cavity 111 is defined at the front of the base 110 to hold the flashlight 200. The circuit control board 120 includes a circuit control board 121, a positive contact 122, and a negative contact 123, the positive and negatives contacts 122, 123 are connected with the circuit control board 120 and whose ends are protruded to the cavity 111. The flashlight 200 has a positive conductive pin 223*a* and a negative conductive pin 223*b* corresponding to the positive and negatives contacts 122, 123 respectively, and the flashlight 200 is held in the cavity 111 so that the positive and negatives contacts 122, 123 are electrically connected with the positive and negative conductive pins 223*a*, 223*b*. The circuit control board 121 is mounted within the base 110 and whose input terminal is electrically connected with external power supply, the flashlight 200 is installed on the front of the base 110 and electrically connected with an outer terminal of the circuit control board 121, and the circuit control board 121 is arranged to control the external power supply for charging the flashlight 200 and a power source 240 of the flashlight 200 for discharging electricity to the lights 130.

Figure 3:
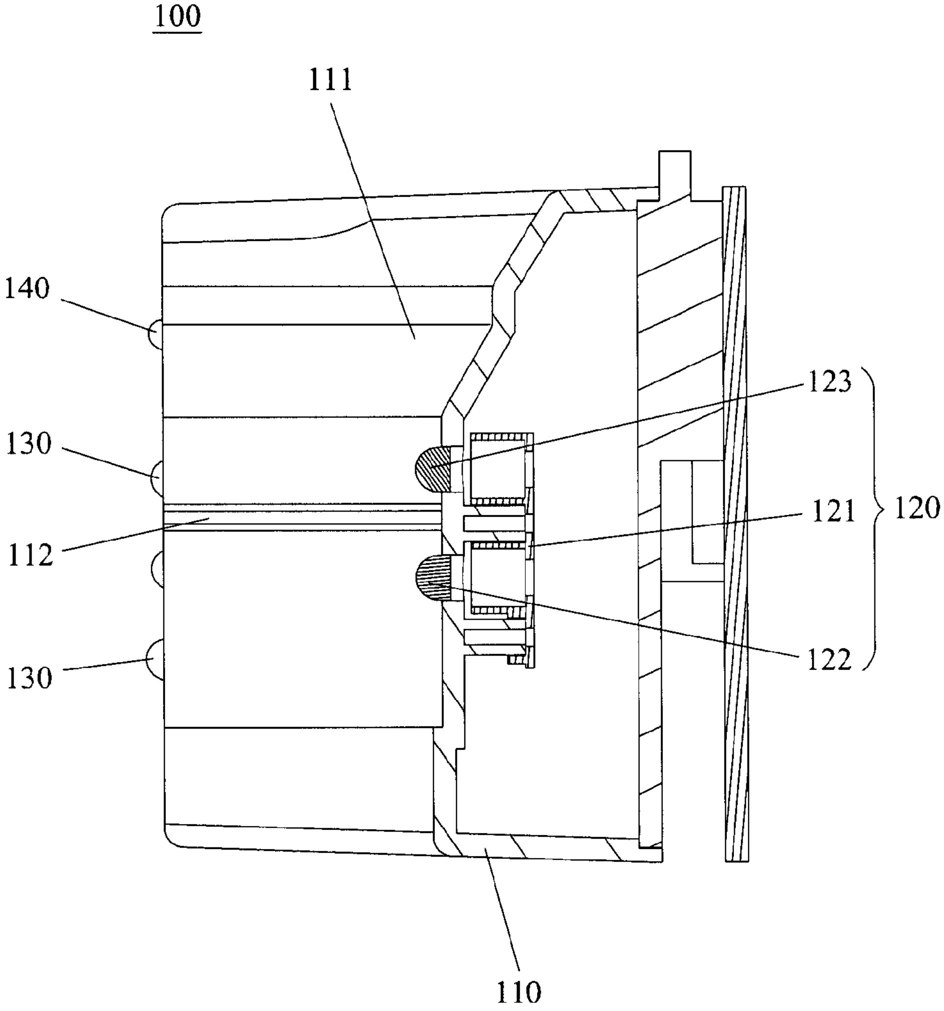
FIG. 3 is a cross-sectional view of the charging stand.
Figure 4:
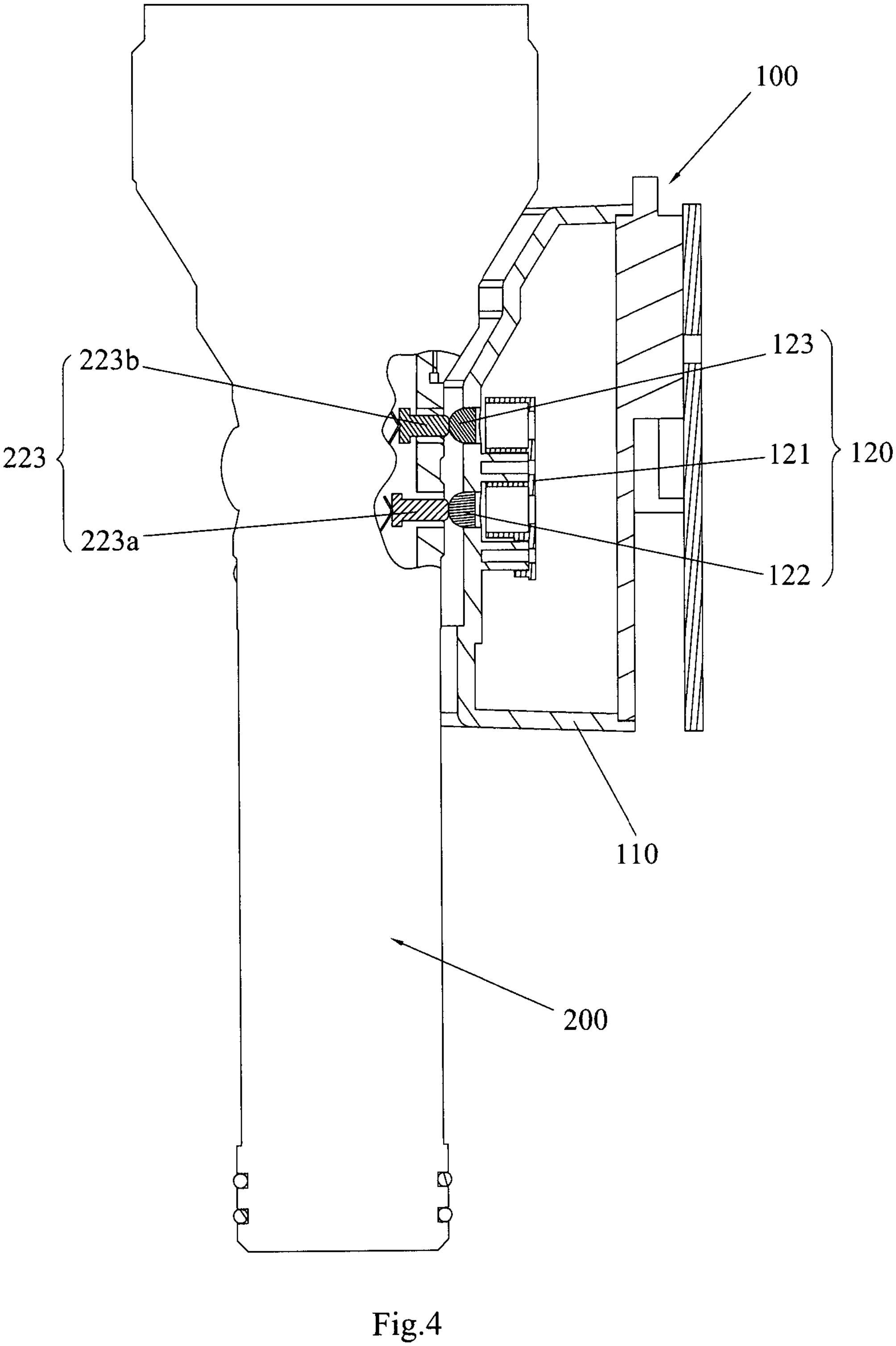
FIG. 4 is a cross-sectional view of the emergency lighting device of the present invention.

Please refer to FIGS. 3 and 4, the indicator light 140 is installed at the front of the base 110, and electrically connected with the circuit controller 120. The indicator light 140 can indicate different signals when the flashlight 200 is charging or charging is finished, so that the charging state is facilitated to be aware.

A flange 112 is formed at inner walls of the cavity 111, and at least one recess 201 is formed at outer side walls of flashlight 200. When the flashlight 200 is disposed in the cavity 111, the flange 112 engages with the recess 201. By cooperation between the flange 112 and the recess 201, under a condition of that the flashlight 200 is installed in the cavity 111, the flange 112 can be acted as a guider and moreover a holder for holding the flashlight 200, so as to ovoid displacement of the flashlight 200 to cause misalignment of the positive and negative contacts 122, 123 of the circuit controller 120.

A hole 113 is provided at the bottom of the base 110, in which the output terminal of the power adapter 150 is inserted and then is electrically connected with the circuit controller 120, and the input terminal of power adapter 150 is electrically connected with the external power source. The power adapter 150 is arranged for converting the input voltage of the external power source to an output voltage that is suitable to charge the flashlight 200, so that the flashlight 200 can be charged under a safe condition.

Figure 5:
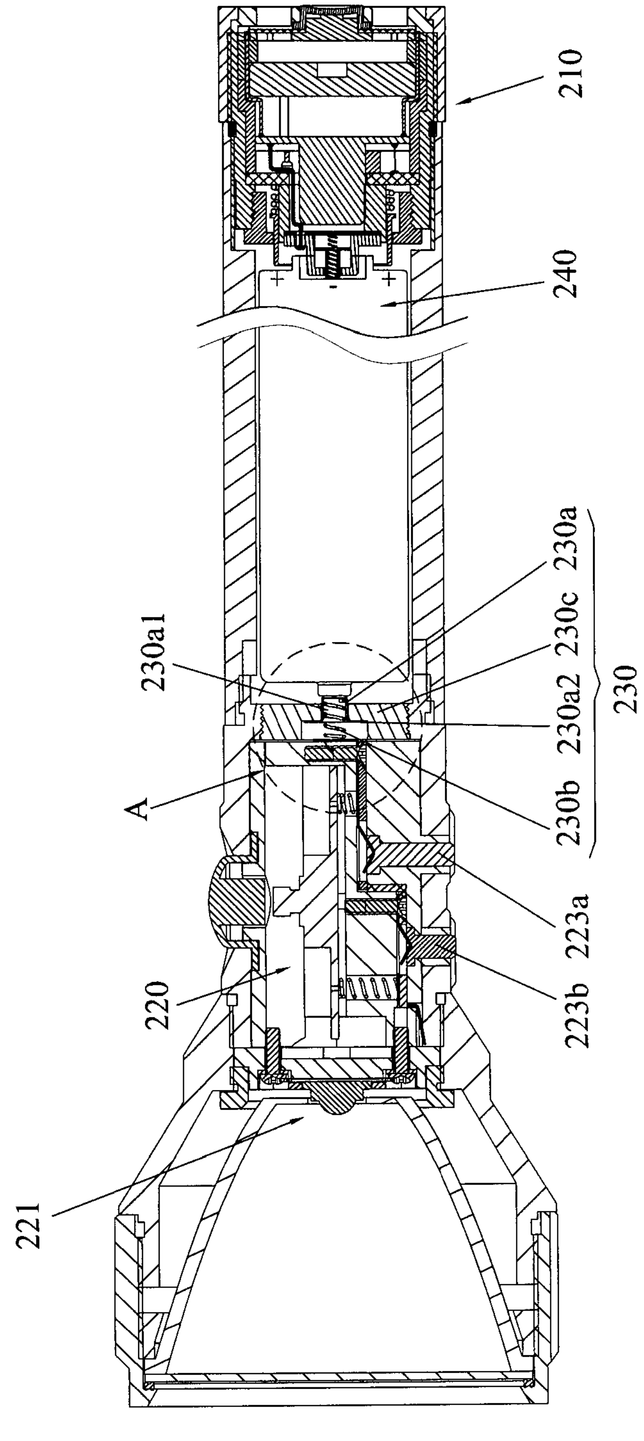
FIG. 5 is a cross-sectional view of a flashlight of the emergency lighting device.
Figure 6:
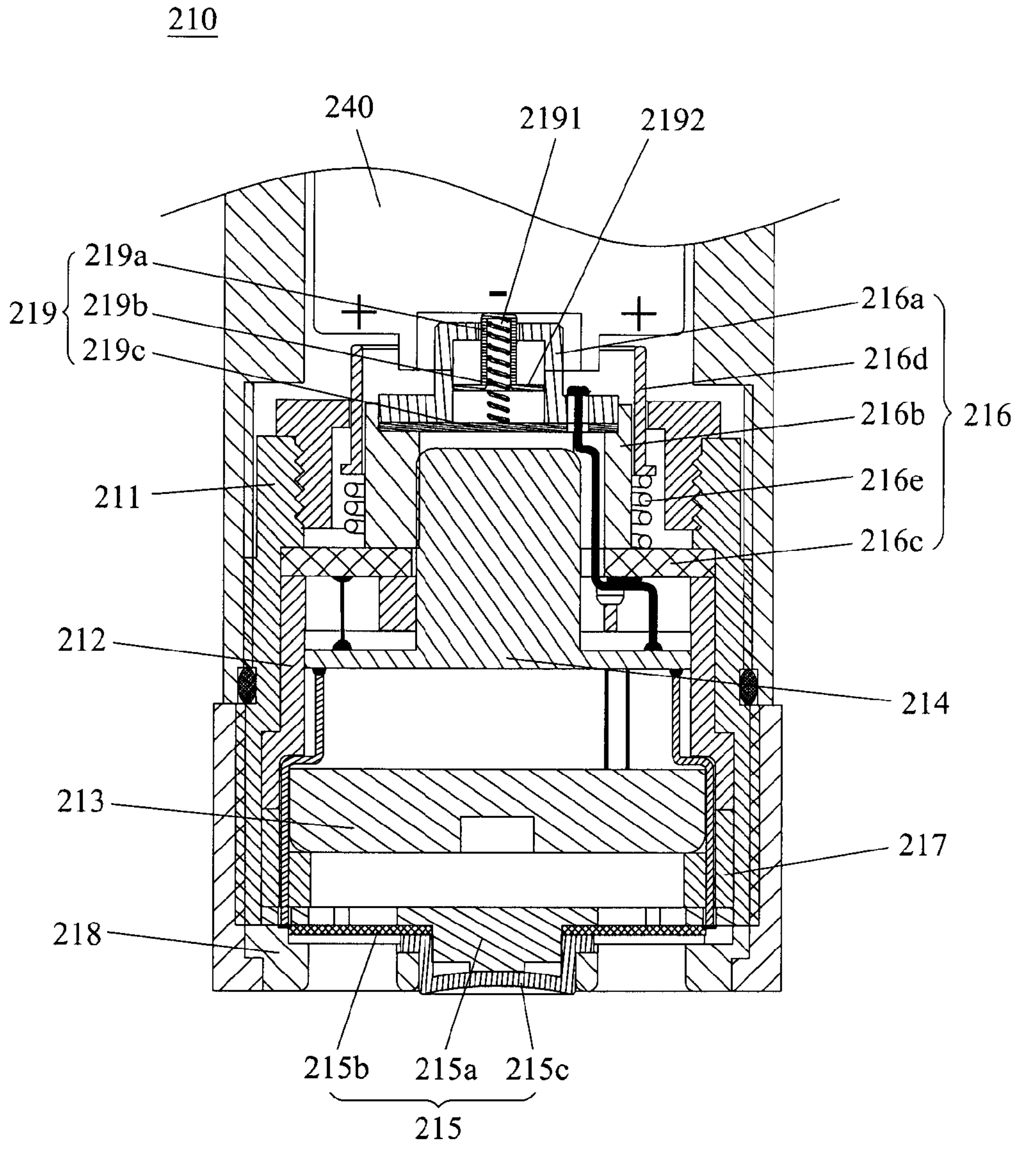
FIG. 6 is a cross-sectional view of an alarm of the emergency lighting device.
Figure 7:
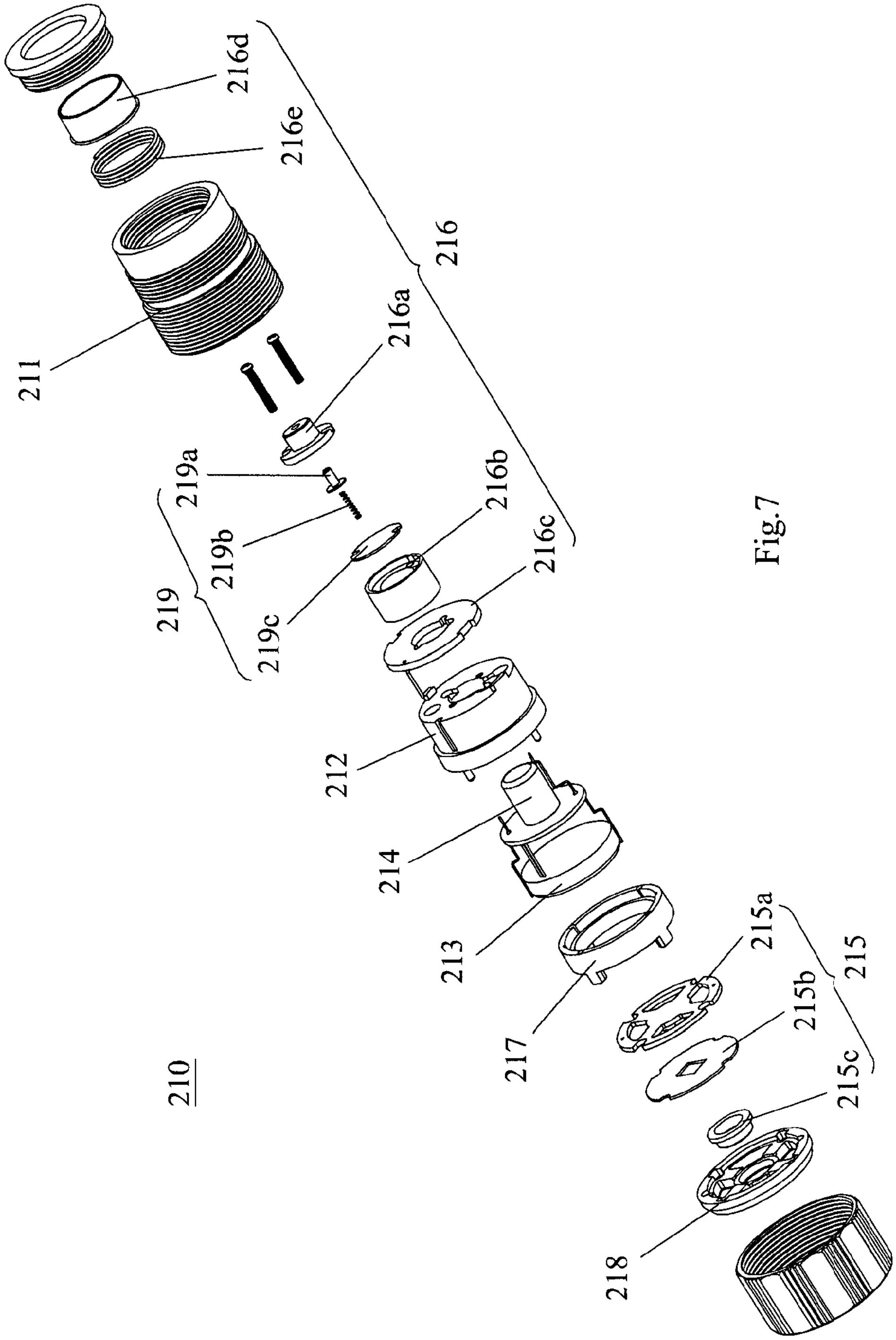
FIG. 7 is an exposed view of the alarm of the emergency lighting device.

As shown in FIGS. 5-7, the flashlight 200 includes an alarm 210, an integrative charging light-emitting device 220, a shock-resistant device 230 and a power source 240. Concretely, the alarm 210 is installed on the tail of the flashlight 200 to give an alarm. The alarm 210 includes a mounting base 211 installed in the flashlight 200, a buzzer stand 212, a buzzer 213, a buzzer drive circuit board 214, a switch controller 215, a conductive assembly 216, a buzzer press plate 217, a casing 218, and elastic assembly 219. Particularly, the buzzer stand 212 is installed in the mounting base 211, the buzzer 213 is installed in the buzzer stand 212, and the buzzer drive circuit board 214 is installed in the buzzer stand 212 and electrically connected with the buzzer 213. The switch controller 215 is installed at the end of the mounting base 211 and electrically connected with the buzzer drive circuit board 214. The conductive assembly 216 is installed in the mounting base 211 and fixed on the buzzer stand 212, which are electrically connected with the power source 240 of the flashlight 200 and electrically connected with the buzzer drive circuit board 241. Concretely, the conductive assembly 216 includes a conductive post 216*a*, a retainer 216*b*, a conductive fiber plate 216*c*, a conductive ring 216*d* and a conductive spring 216*e*. The conductive post 216*a* has an upper end contacting with a cathode of the power source 240 of the flashlight 200, and a lower end electrically connected with the negative contact of the buzzer drive circuit board 214, and the conductive post 216*a* is fixed on the retainer 216*b* which is fixed on the conductive fiber plate 216*c*. And the conductive fiber plate 216*c* is electrically connected with the positive contact of the buzzer drive circuit board 214, the retainer 216*b* is sleeved with the conductive spring 216*e* which has a lower end electrically contacting the conductive fiber plate 216*c* and an upper end electrically contacting with the conductive ring 216*d*, and the conductive ring 216*d* is sleeved around the retainer 216*b* and is electrically contacted with the anode of the power source 240 of the flashlight 200.

The buzzer press plate 217 is installed in the mounting base 211 and pressed against the buzzer 213, so that the buzzer 213 can be fixed on the buzzer stand 212, which may avoid wobble or displacement of the buzzer 213 to keep the function of the buzzer 213.

The switch controller 215 includes a switch control plate 215*a*, a sponge mat 215*b* and a switch cap 215*c*. Concretely, the switch cap 215*c* is sleeved on a switch button of the switch control plate 215*a*, the sponge mat 215*b* is assembled between the switch control plate 215*a* and the switch cap 215*c*, and the switch control plate 215*a* is installed in the mounting base 211. Specifically, the switch control plate 215*a* is used for controlling the connection or disconnection of the buzzer drive circuit board 214, the sponge mat 215*b* is used for insulating the switch control plate 215*a* from the external, and the switch cap 215*c* covering on the switch button of the switch control plate 215*a* is used for insulating and protecting the switch button.

The casing 218 of the alarm 210 is assembled on the tail of the flashlight 200, and the center of the casing 218 is hollow to accommodate the switch cap 215. Such a casing 218 is used for preventing the outside impurity entering to the buzzer 213 to baffle the acoustic.

The elastic assembly 219 includes a pin 219*a*, a spring 219*b* and a baffle plate 219*c*, therein the spring 219*b* is disposed in the conductive post 216*a*, one end of the spring 219*b* is electrically contacted with the pin 219*a*, and the other end is electrically contacted with the baffle plate 219*c* that is electrically connected to the lower end of the conductive post 216*a*. Concretely, the pin 219*a* has a head that is protruded to the upper end of the conductive post 216*a* and electrically contacted with the cathode of the power source 240 of the flashlight 200. With the arrangement that the spring 219*b* is disposed in the conductive post 216*a*, and the pin 219*a* is urged by spring force of the spring 219*b*, the pin 219*a* can keep a connection with the cathode of the power source 240, thereby ensuring reliability of the conductive post 216*a* and the power source 240.

Specifically, a hole 2191 is defined on the pin 219*a*, and a flange 2192 is extended from the end of the pin 219*a*. The hole 2191 has a bottom for contacting the spring 219*b*, and the flange 2192 is capable of contacting the bottom of the conductive post 216*a* thereby prevent the pin 219*a* disengaging from the conductive post 216*a*.

Figure 8:
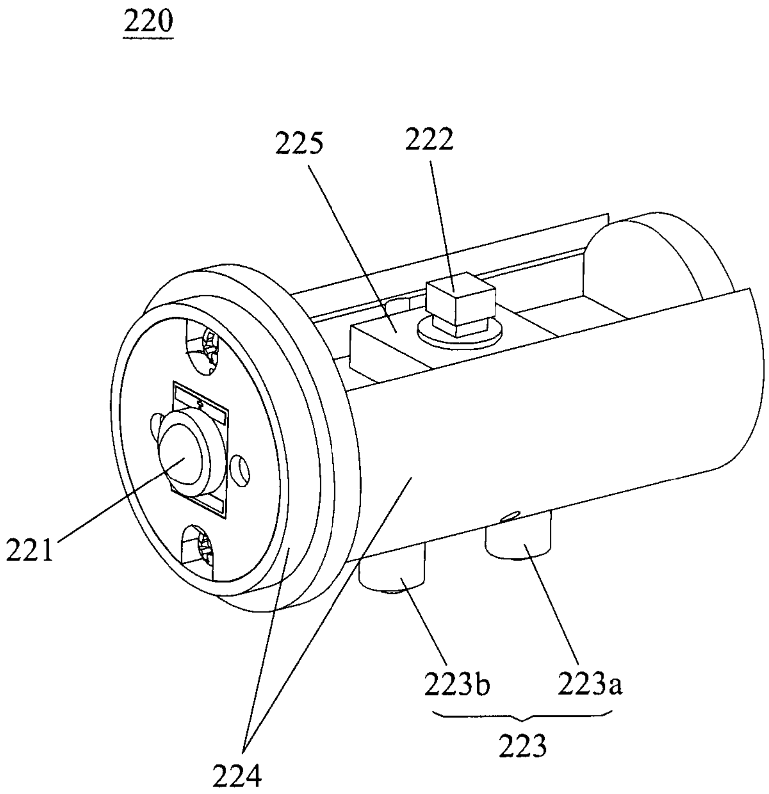
FIG. 8 is a schematic view of an integrative charging and light-emitting device of the emergency lighting device.
Figure 9:
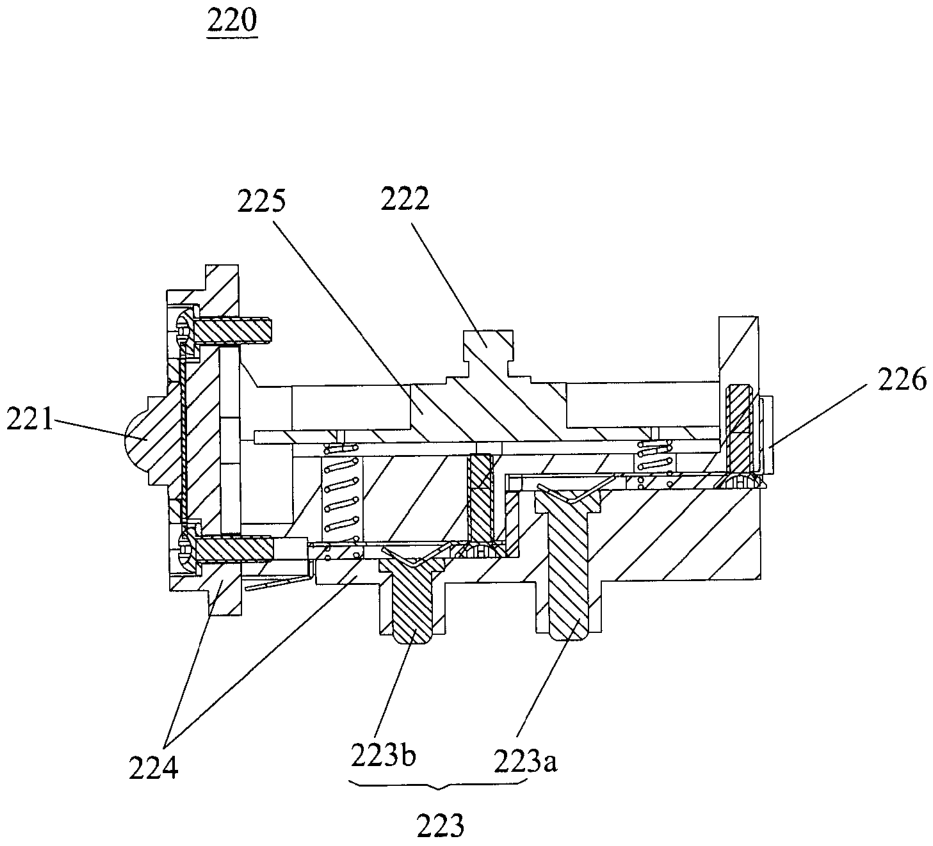
FIG. 9 is a cross-sectional view of an integrative charging and light-emitting device of the emergency lighting device.

As shown in FIGS. 8 and 9, the integrative charging light-emitting device 220 is installed in the front end of the flashlight 200 and which is integrative structure. The integrative charging light-emitting device 220 includes a light-emitting assembly 221, a switch assembly 222, a charging assembly 223, a device body 224 and a microcontroller 225. Concretely, the light-emitting assembly 221 is installed in the front end of the device body 224 and faced to the head of the flashlight 200, and a conductive piece provided at the back end of the device body is electrically connected with the light-emitting assembly 221 whose cathode is electrically connected with the cathode of the power source 240. The charging assembly 223 installed in the device body 224 includes a positive conductive pin 223*a* and a negative conductive pin 223*b*, one end of the positive conductive pin 223*a* is electrically connected with the conductive piece 226, and the other end of the positive conductive pin 223*a* passes through the device body 224 and is formed on the head of the flashlight 200 and electrically connected with the positive contact 122 of the charging stand 100; one end of the negative conductive pin 223*b* is electrically connected with the cathode of the light-emitting assembly 221, and the other end of the negative conductive pin 223*b* is electrically connected with the negative contact 123 of the charging stand. The switch assembly 222 is installed on the device body 224 and adapted for electrically connecting or disconnecting the power source 240 of the flashlight 200 with the light-emitting assembly 221. Due to the integrative charging light-emitting device 220 is an integrative structure, thus its assembly and disassembly are very convenient on one hand, and the electrical connection between the integrative charging light-emitting device 220 and the power source 240 of the flashlight 200 is good on the other hand, which has good impact-resistant performance to keep a reliable operation for the integrative charging light-emitting device 220.

The microcontroller 225 has an anode electrically connected with the anode of the light-emitting assembly 221 and the conductive piece 226 respectively, and a cathode electrically connected with the light-emitting assembly 221 and the cathode of the power source 240 of the flashlight 200 respectively. The switch assembly has a bottom mounted on the microcontroller 225 and a top protruded out of the device body 224, and the switch assembly 222 is arranged to control light strength of the light-emitting assembly 221 by the microcontroller 225.

Figure 10:
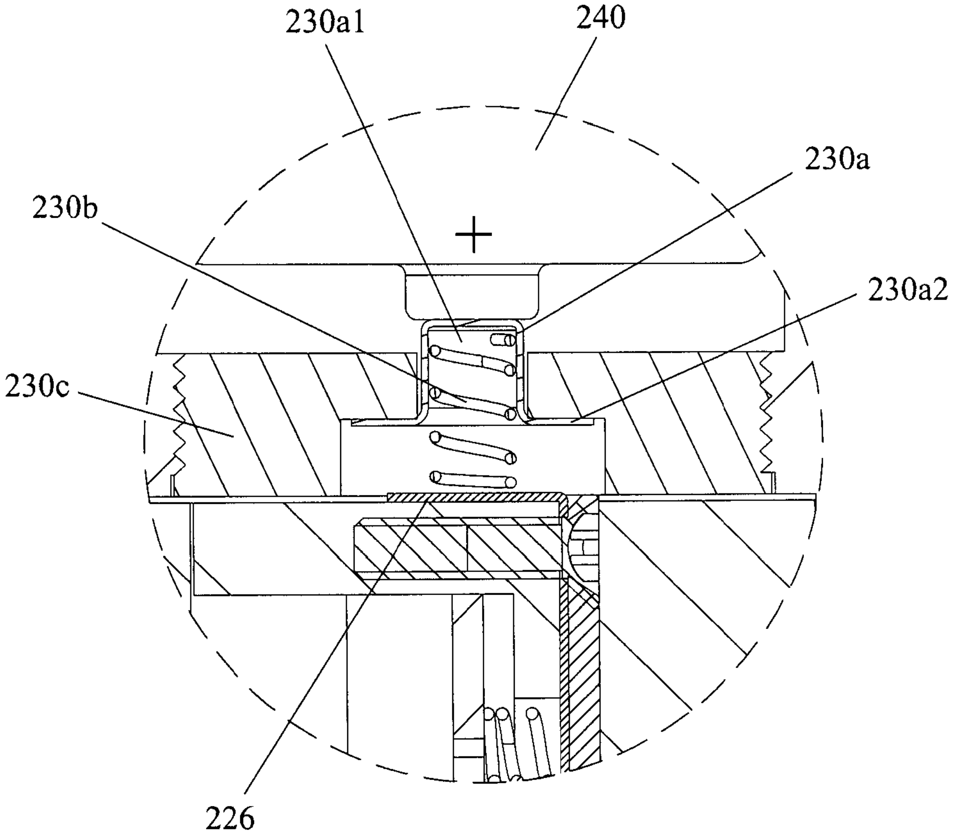
FIG. 10 is an enlarged view of a portion A shown in FIG. 5.

As shown in FIG. 10, the impact-resistant device 230 includes a conductive protective piece 230*a*, a conductive buffer spring 230*b* and a hollow insulating base 230*c*. Concretely, the insulating base 230*c* is embedded in the back end of the head of the flashlight 200; the conductive protective piece 230*a* is embedded in the insulating base 230*c* and has a cavity 230*a*1 to accept the buffer spring 230*b*, and a contacting portion 230*a*2 is provided at the front end of the conductive protective piece 230*a* to contact with the insulating base 230*c*; the buffer spring 230*b* has a front end elastically connected with the conductive piece 226 and a back end elastically inserted into the conductive protective piece 230*a* and contacting the bottom of the cavity 230*a*1; and the conductive protective piece 130*a* has a back end that is capable of elastically protruding out of the insulating base 230*c* to contact with the anode of the power source 240 of the flashlight 200. With such an arrangement that the buffer spring 230*b* is arranged between the conductive protective piece 230*a* and the conductive piece 226, such that an impact or shock suffered by the integrative charging light-emitting device 220 will be buffered, thereby avoiding a poor connection in the power source 240 of the flashlight 200 and thus always maintaining a good connection between the integrative charging light-emitting device 220 and the power source 240.

In comparison with the prior art, the present invention provides a flashlight 200 installed on the charging stand 100, and several lights 130 installed on the base 110 of the charging stand 100. The lights 130 will be turned on or turned off controlled by the circuit controller 120. If external power source is cut off, the lights 130 can irradiate by using the power source 240 of the flashlight 200, so that it can be easily noticed by persons in dark on one hand, and it can provide emergency lighting to help people to face with a power-cut situation on the other hand. In other words, the charging stand can be acted as a charger to charge the flashlight 200 or functioned to provide an emergency light. Additionally, the alarm 210 is formed on the flashlight 200, which controls the buzzer drive circuit 214 to cause the buzzer 213 to sound by controlling the switch controller 215, so as to achieve a buzzer alarm. Such an arrangement of the alarm 210 plays a very importance role in calling for help when an emergency happens. Furthermore, the alarm 240 is installed in the flashlight 200 directly, which increases the functions of the flashlight 200 and facilitates the using and carrying. The handy emergency lighting device 1 of the present invention is quit easy to use, which is applicable to family, workshop, hallway, dark way or safe exit.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An emergency lighting device, comprising a charging stand and a flashlight disposed upon the charging stand to charge, wherein the charging stand comprised a base, a circuit controller, and several lights, and a cavity is formed on the front of the base to hold the flashlight; the circuit controller comprises a circuit control board, a positive contact, and a negative contact, the positive and negatives contacts are connected with the circuit control board and whose ends are protruded to the cavity; a positive conductive pin and a negative conductive pin corresponding to the positive and negatives contacts are provided on the flashlight, the flashlight is held in the cavity so that the positive and negatives contacts are electrically connected with the positive and negative conductive pins; the circuit control board installed in the base, whose input terminal is electrically connected with external power supply and output terminal is electrically connected with the flashlight that is installed on the front of the base; and the circuit control board is arranged to control the external power supply for charging the flashlight and a power source of the flashlight for discharging electricity to the lights;

the flashlight comprises an alarm mounted on a tail of the flashlight to alarm, and the alarm comprises a mounting base installed in the flashlight, a buzzer stand installed in the mounting base, a buzzer installed in the buzzer stand, a buzzer drive circuit board installed in the buzzer stand and electrically connected with the buzzer, a switch controller installed at an end of the mounting base and electrically connected with the buzzer drive circuit board, and a conductive assembly installed in the mounting base and fixed on the buzzer, and electrically connected with the power source of the flashlight and the buzzer drive circuit board respectively; wherein the conductive assembly comprises a conductive post, a retainer, a conductive fiber plate, a conductive ring and a conductive spring, the conductive post has an upper end contacting a cathode of the power source of the flashlight, and a lower end electrically connected with a negative contact of the buzzer drive circuit board, and the conductive post is fixed on the retainer which is fixed on the conductive fiber plate, the conductive fiber plate is electrically connected with a positive contact of the buzzer drive circuit board, the retainer is sleeved with the conductive spring which has a lower end electrically contacting the conductive fiber plate and an upper end electrically contacting the conductive ring, and the conductive ring sleeves the retainer an is electrically contacts with an anode of the power source of the flashlight.

2. The emergency lighting device according to claim 1, wherein the charging stand further comprises an indicator light installed on the front of the base and electrically connected with the circuit controller.

3. The emergency lighting device according to claim 1, wherein a flange is formed at inner side walls of the cavity, and at least one recess is formed at outer side walls of the flashlight, the flange engages with the recess after the flashlight is disposed in the cavity.

4. The emergency lighting device according to claim 1, wherein the charging stand further comprises a power adapter, a hole is formed at a bottom of the base, and the power adapter has an output terminal inserted into the hole and electrically connected with the circuit controller, and an input terminal electrically connected with the external power supply.

5. The emergency lighting device according to claim 1, wherein the alarm further comprises a buzzer press plate installed in the mounting base and pressed against the buzzer.

6. The emergency lighting device according to claim 1, wherein the switch controller comprises a switch control plate, a sponge mat, and a switch cap sleeved on a switch button of the switch control plate, the sponge mat is sleeved between the switch control plate and the switch cap, and the switch control plate is installed in the mounting base; the alarm further comprises a casing mounted on the tail of the flashlight, and the center of the casing is hollow to accommodate the switch cap.

7. The emergency lighting device according to claim 1, wherein the alarm further comprises an elastic assembly having a pin, a spring and a baffle plate; a hole is formed on the pin, and a flange is extended from an end of the pin; the spring is disposed in the conductive post, one end of which is accommodated in the hole and electrically contacted a bottom of the hole, and the other end of which is electrically contacted the baffle plate; the baffle plate is electrically connected with the lower end of the conductive post, the pin has a head that is protruded to the upper end of the conductive post and electrically contacted the cathode of the power source of the flashlight, and the flange of the pin is capable of contacting a bottom of the conductive post to prevent the pin disengaging from the conductive post.

8. The emergency lighting device according to claim 1, wherein the flashlight further comprises an integrative charging light-emitting device embedded in a front end of the flashlight and which comprises a light-emitting assembly, a switch assembly, a charging assembly and a device body; wherein the light-emitting assembly is installed in a front end of the device body and faced to a head of the flashlight, a conductive piece is provided at a back end of the device body and electrically connected with the light-emitting assembly, a cathode of the light-emitting assembly is electrically connected with the cathode of the power source of the flashlight; the charging assembly installed in the device body comprises the positive conductive pin one end of which is electrically connected with the conductive piece, and the other end of which passes through the device body and is formed on a head of the flashlight and electrically connected with the positive contact of the charging stand, and the negative conductive pin one end of which is electrically connected with the cathode of the light-emitting assembly, and the other end of which is electrically connected with the negative contact of the charging stand; and the switch assembly is installed on the device body and adapted for electrically connecting or disconnecting the power source of the flashlight with the light-emitting assembly.

9. The emergency lighting device according to claim 8, wherein the integrative charging light-emitting device further comprises a microcontroller disposed in the device body, the microcontroller has an anode electrically connected with the anode of the light-emitting assembly and the conductive piece respectively, and a cathode electrically connected with the light-emitting assembly and the cathode of the power source of the flashlight respectively; the switch assembly has a bottom mounted on the microcontroller and a top protruded out of the device body, and the switch assembly is arranged to control light strength of the light-emitting assembly.

10. The emergency lighting device according to claim 1, wherein the flashlight further comprises an impact-resistant device including a conductive protective piece, a conductive buffer spring and a hollow insulating base, wherein the insulating base is embedded in the head of the flashlight, the conductive protective piece is embedded in the insulating base and has a cavity to accept the buffer spring, and a contacting portion is provided at a front end of the conductive protective piece to contact with the insulating base; the buffer spring has a front end elastically connected with the conductive piece and a back end elastically inserted into the conductive protective piece and contacting the bottom of the cavity; and the conductive protective piece has a back end that is capable of elastically protruding out of the insulating base to contact with the anode of the power source of the flashlight.

* * * * *